United States Patent

Fukino

[11] Patent Number: 5,983,034
[45] Date of Patent: Nov. 9, 1999

[54] LENS BARREL HAVING A SURFACE WAVE MOTOR

[75] Inventor: Kunihiro Fukino, Fujisawa, Japan

[73] Assignee: Nikon Corporation, Tokyo, Japan

[21] Appl. No.: 09/145,033

[22] Filed: Sep. 1, 1998

[30] Foreign Application Priority Data

Sep. 30, 1997 [JP] Japan .................................. 9-265232

[51] Int. Cl.$^6$ ............................... G03B 3/10; G02B 7/09
[52] U.S. Cl. ........................... 396/133; 396/137; 359/824
[58] Field of Search ............................ 396/85, 137, 133; 359/824, 696

[56] References Cited

U.S. PATENT DOCUMENTS 5,708,872  1/1998  Fukino .................................... 396/133

FOREIGN PATENT DOCUMENTS 9-281378  10/1997  Japan .

Primary Examiner—W. B. Perkey

[57] ABSTRACT

A lens barrel including a surface wave motor to generate surface waves to drive a photographic optical system. The surface wave motor includes a fixed member to generate surface waves to drive the moving member which drives the photographic optical system. An externally operated manual operation unit drives the photographic optical system upon manual operation thereof. A roller is mounted in a freely rotatable state on the fixed member, and is in compressive contact with the manual operation unit via an intermediate ring. When a mode selection switch is set to a manual focus adjustment mode, the fixed member comes into compressive contact with a rotary element, and is rotatable integrally with a cam ring. By rotating a rotation ratio setting ring in a circumferential direction, a large diameter portion of the roller comes into contact with a changeover ring, and a small diameter portion of the roller to comes into contact with a changeover ring. Accordingly, the ratio of the rotation angles of the fixed member and the hand-operated ring can be changed in two steps. As a result, when the hand-operated ring is rotated during photography, the focus adjustment optical system for focus adjustment can be driven quickly or slowly for easy operability of manual focus adjustment.

11 Claims, 5 Drawing Sheets

LENS BARREL HAVING A SURFACE WAVE MOTOR

CROSS-REFERENCE TO RELATED APPLICATIONS

This application is based upon and claims priority of Japanese Patent Application No. 09-265232 filed Sep. 30, 1997, the contents being incorporated herein by reference.

BACKGROUND OF THE INVENTION

1. Field of the Invention

The present invention relates to a lens barrel including a surface wave motor to drive a photographic lens, and, more particularly, the present invention relates to a lens barrel having a surface wave motor and a rotation angle conversion device to transmit a rotation angle of a hand-operated unit to a rotation angle of a fixed member of the surface wave motor.

2. Description of the Related Art

A lens barrel having a built-in surface wave motor is known, for example, as disclosed in Japanese Laid-Open Patent Publication JP-A-8-98191. The lens barrel having a built-in surface wave motor disclosed in JP-A-8-98191 includes a photographic optical system, a fixed member, a hand-operated member, a fixed tube and a mode selection member. The fixed member and the hand-operated member are integrally coupled such that rotation with respect to the fixed tube is possible. The mode selection member is an electrical switch to select a mode of focus adjustment.

In operation of the known lens barrel, when a manual focus adjustment mode is selected by the mode selection member, a moving member and the fixed member of the surface wave motor become integral, and the photographic optical system is driven by rotation coupled to the manual operation of the hand-operated member. Because of the relationship between the fixed member and the moving member, when in the manual focus adjustment mode, the contact surface of the moving member and the fixed member does not become damaged, and is capable of driving the photographic optical system. Moreover, when an automatic focus adjustment mode is selected by the mode selection member, the fixed member is fixed relative to the fixed tube, and the photographic optical system is moved by the rotation of the moving member.

FIG. 3 is a cross-sectional diagram of a prior art lens barrel having a built-in surface wave motor. FIG. 4 is a partial side view diagram, seen externally of the lens barrel in an axial direction, of a roller of a prior art lens barrel having a built-in surface wave motor. FIG. 5 is a cross-sectional diagram of an electrical power supply unit of a prior art lens barrel having a built-in surface wave motor. FIG. 6 is a schematic block diagram of a prior art lens barrel having a built-in surface wave motor.

Furthermore, the state of the lens barrel shown in FIG. 3 is in an automatic focus adjustment mode. The mode changeover switch 20 sets the automatic focus adjustment mode, in which the optical system L2, L3 for performing focus adjustment is driven by the rotational force of the surface wave motor Mo (FIG. 6).

As shown in FIG. 3, the optical system L2, L3 for performing focus adjustment is supported by a lens support tube 2, and performs focus adjustment by movement in the optical axis direction. The lens support tube 2 is located in the internal circumference of a central middle diameter portion 1a of a fixed barrel 1, and is fitted movably in the optical axis direction. A projecting pin 3 is mounted in the outer circumference of the lens support tube 2. The projecting pin 3 passes through a guide groove which is parallel to the optical axis and is disposed in the central middle diameter portion 1a of the fixed barrel 1. The front end of the projecting pin 3 engages a cam groove 4a disposed in the inner circumferential surface of a cam ring 4.

The inner circumferential portion of the cam ring 4 fits onto the outer circumferential portion of the central middle diameter portion 1a of the fixed barrel 1. A circular circumferential groove 4b is formed in the inner circumferential surface of the cam ring 4. A projecting pin 5, mounted on the outer circumferential surface of the central middle diameter portion 1a, fits, in a freely movable state, into the circular circumferential groove 4b. Because of the above arrangement, the cam ring 4 is immovable in the optical axis direction, and is rotatable in only a predetermined angular range centered on the optical axis. Moreover, a distance scale (not shown) is displayed on the right-hand side large diameter circumferential portion 4c of the cam ring 4.

A fixed element 6 of the surface wave motor Mo rotates with the optical axis as center, and generates surface waves. An inner circumferential portion of the fixed element 6 fits into an outer circumferential portion of a central small diameter portion 1c of the fixed barrel 1. A plurality of rotation shafts 26 having rotary axial lines in a direction at right angles to the optical axis are mounted in the outer circumferential surface of the fixed member 6. Freely rotatable rollers 25 are mounted on the rotary shafts 26.

A rotary element 9 of the surface wave motor Mo generates a drive force to drive the focus adjustment optical system L2, L3, rotating centered on the optical axis by the surface wave generated by the fixed element 6. The rotary element 9 is in frictional contact with the fixed element 6, and rotates freely relative to the fixed element 6 via a bearing 12. An engagement groove 9a is disposed in the left-hand side of the rotary element 9, and engages with a cooperating projection 4d disposed in the right-hand side, large diameter inner circumferential portion 4c of the cam ring 4. Because of the arrangement of the engagement groove 9a and cooperating projection 4d, when the fixed element 6 generates surface waves, the rotary element 9 and the cam ring 4 rotate integrally, centered on the optical axis, as a result of the surface wave. Moreover, a biasing member 14 places the rotary element 9 in frictional contact with the fixed element 6 via a disc 13.

A hand-operated ring 10 drives the focus adjustment optical system L2, L3 in the optical axis direction by an external operation by the photographer. The hand-operated ring 10 has its two ends respectively fitted into a large diameter portion 1d and a left-hand large diameter portion 1e of the fixed barrel 1. The hand-operated ring 10 is immovable in the optical axis direction, and is freely rotatable centered on the optical axis. An intermediate ring 7, formed of transparent synthetic resin, is rotatably disposed in an inner circumferential portion of the hand-operated ring 10.

A biasing member 11 presses on the fixed element 6 via the roller 25, and confers a predetermined frictional torque on the inner circumferential surface of the large diameter portion 1d of the fixed barrel 1, such that the fixed element 6 does not easily rotate when in the automatic focus adjustment mode. As shown in FIG. 3, the biasing member 11 is disposed between the central small diameter portion 1c of the fixed barrel 1 and the fixed element 6.

A biasing member 27 is disposed between the hand-operated ring 10 and the intermediate ring 7 in the inner circumferential surface of the large diameter portion 1d of the fixed barrel 1. The biasing member 27 presses the intermediate ring 7 via the roller 25, and causes frictional contact between biasing member 27, intermediate ring 7 and roller 25.

The roller 25 transmits the rotation angle of the hand-operated ring 10 to the rotation angle of the fixed element 6 (cam ring 4) of the surface wave motor Mo at an optional ratio. The roller 25 has an inner ring of metal and has an outer circumference covered with rubber. As shown in FIG. 4, the roller 25 is formed in two portions, with a large diameter portion 25a having a diameter Db at its outer circumferential surface, and a small diameter portion 25b having a diameter Db' (Db>Db'). The outer circumferential surface of the roller 25 has a difference in diameter, changing in its external diameter in the axial direction of the rotary shaft 26. The small diameter portion 25b, having diameter Db', contacts the side surface of the intermediate ring 7, and the large diameter portion 25a, having diameter Db, contacts the side surface of the large diameter portion 1d of the fixed barrel 1.

Accordingly, when the hand-operated ring 10 is rotated, the roller 25 rotates between the intermediate ring 7 and the large diameter portion 1d of the fixed barrel 1, and the fixed element 6 rotates centered on the optical axis on the outer circumference of the central small diameter portion 1c of the fixed barrel 1. At this time, the ratio Rr of the fixed element 6 (cam ring 4) relative to the rotation angle of the intermediate ring 7 is represented by the following Equation (1), in accordance with the principle of planetary gear devices.

$$Rr = (Db \cdot Dc)/(Da \cdot Db' + Db \cdot Dc) \qquad \text{Eq. (1)}$$

In Equation (1), Da is the diameter of the region of contact of the roller 25 with the fixed barrel 1; and, Dc is the diameter of the region of contact of the roller 25 and the intermediate ring 7.

As shown in FIG. 3, a window member 8 allows the distance scale which is displayed on the right-hand, large diameter, circumferential portion 4c of the cam ring 4 to be read out through the intermediate ring 7 made of transparent synthetic resin. The window 8 is disposed in the large diameter portion 1d of the fixed barrel 1, and is made of transparent synthetic resin.

A glass epoxy plate 15 is fixed to the fixed element 6. As shown in FIG. 5, conductive portions 15a having an annular form are disposed along the whole circumference of the fixed element 6. Because of the arrangement of the conductive portions 15a, brushes 16 slide on the conductive portions 15a, and electrical connection is possible with respect to the fixed element 6, regardless of the angular position of the fixed element 6. Furthermore, the glass epoxy plate 15 has through holes 15b disposed in positions offset from the conductive annular portions 15a. The conductive portions 15a make electrical contact with the fixed element 6 from its back surface through the conductive portions of the back surface of the glass epoxy plate 15.

A pressure plate 17 fixes the brushes 16 in a brush fixing plate 18. The brush fixing plate 18 is fixed by small screws 19 to the fixed barrel 1.

As shown in FIG. 3, the mode changeover switch 20 is slidably disposed on the fixed barrel 1, and is a switch which slides in the direction M to set the manual focus adjustment mode and slides in the direction A to set the automatic focus adjustment mode. The mode changeover switch 20 corresponds to the mode selection unit 31 shown in FIG. 6, and generates electrical signals according to the respective mode. When the mode of operation is changed to the automatic focus adjustment mode, the power supply unit 100 supplies electric power to the surface wave motor Mo.

As shown in FIG. 3, a changeover plate 21 is fixed to the changeover switch 20 by a small screw 23. A plate spring 22 is fixed to the fixed barrel 1 by a small screw 24. The plate spring 22 is disengageable in plural engagement grooves 6a located in the outer circumferential portion of the fixed element 6.

When the mode changeover switch 20 slides in the M direction to change to the manual focus adjustment mode, the changeover plate 21 moves at the same time. The changeover plate 21 then presses the plate spring 22 downward, as shown by the dotted lines FIG. 3, the plate spring 22 separates from the engagement grooves 6a of the fixed element 6, and the hand-operated ring 10 is rotatable.

When the mode changeover switch 20 slides in the A direction to change to the automatic focus adjustment mode, the changeover plate 21 moves at the same time. The plate spring 22 then returns to the initial state, as shown by the full lines in the FIG. 3, and engages with the engagement grooves 6a of the fixed element 6. As a result, the hand-operated ring 10 is prevented from rotating.

Furthermore, by setting A as the frictional torque of the fixed element 6 and the rotary element 9, B as the frictional torque of the fixed barrel 1 and the fixed element 6, and C as the torque which is necessary to drive the lens support tube 2, the condition C<B<A is satisfied.

The operation of a prior art lens barrel having a built-in surface wave motor will now be described below. The automatic focus adjustment mode will be described first.

As shown by the full lines in FIG. 3, when the prior art lens barrel is in the automatic focus adjustment mode, the mode changeover switch 20 is in the A position, and the engagement grooves 6a of the fixed element 6 and the plate spring 22 are in engagement. Because of the engagement between the engagement grooves 6a and the plate spring 22, rotation of the hand-operated ring 10 is prevented, and the fixed element 6 is also in a state in which it cannot rotate.

Power is supplied to the surface wave motor Mo by a control mechanism (not shown in FIG. 3) corresponding to the power supply unit 100 shown in FIG. 6, to generate surface traveling waves in the fixed element 6, thereby causing the rotary element 9 to rotate in the circumferential direction. The left-hand side engagement groove 9a of the rotary element 9 engages with the engagement projection 4d disposed in the cam ring 4. When the rotary element 9 rotates, the rotary element 9 and the cam ring 4 rotate integrally. Then, when the cam ring 4 rotates, the lens support tube 2 moves along the optical axis, and performs the focus adjustment of the focus adjustment optical system L1, L2.

The manual focus adjustment mode will now be described below. When the lens barrel is in the manual focus adjustment mode, the mode changeover switch 20 slides in the M direction in FIG. 3. By moving the mode changeover switch 20 in the M direction, the electrical power supply to the surface wave motor Mo is cut off.

When the mode changeover switch 20 slides in the M direction, the changeover plate 21 fixed to the mode changeover switch 20 moves at the same time, and presses down the plate spring 22, which is fixed to the fixed barrel 1. By pressing the plate spring 22 downward, the plate spring 22 separates from the engagement grooves 6a in the outer circumferential portion of the fixed element 6.

When the engagement grooves 6a and the plate spring 22 are separated, the hand-operated ring 10 is rotatable.

Furthermore, because the electric power supply to the surface wave motor Mo is cut off, the surface wave motor Mo does not drive, and the fixed element 6 and the rotary element 9 are in a state in which they are forcibly pressed by the biasing member 14.

Furthermore, because the frictional torque A of the fixed element 6 and the rotary element 9, and the torque required to drive the lens support tube 2, satisfy the condition C<A, the fixed element 6 and the rotary element 9 rotate integrally via the intermediate ring 7 when the hand-operated ring 10 rotates.

When the rotary element 9 rotates, the rotary element 9 and the cam ring 4 rotate integrally because the engagement groove 9a of the left-hand side of the rotary element 9 is engaged with the engagement projection 4d on the cam ring 4. When the cam ring 4 rotates, the lens support tube 2 moves in the optical axis direction, and the focus adjustment optical system L2, L3 performs focus adjustment.

When the prior art lens barrel having a built-in surface wave motor is in the automatic focus adjustment mode, the mode changeover switch 20 is in the A position, and the engagement grooves 6a in the outer circumferential portion of the fixed element 6 are engaged with the plate spring 22. Because of the engagement of the engagement grooves 6a and plate spring 22, the hand-operated ring 10 is prevented from rotating, and the fixed element 6 is also in a state in which it cannot rotate.

However, even when the engagement grooves 6a and the plate spring 22 are not engaged, the frictional torque B of the fixed barrel 1 and the fixed element 6, and the torque required to drive the lens support tube 2, satisfy the condition C<B. Because of this, the changeover between the automatic focus adjustment mode and the manual focus adjustment mode can be performed in a simple manner according to whether or not electric power is supplied to the surface wave motor Mo.

Accordingly, optional photographic ranges are stored, and after having photographed according to separate photographic ranges, during photography in the automatic focus adjustment mode, a "go-home" photographic function drives the lens to the stored photographic range. When manual focus adjustment is performed, the hand-operated ring 10 is rotated, instantaneously changing over to the manual focus adjustment mode, and mechanical changeover becomes unnecessary. Because of this, it is easy to include a mechanism for rapidly performing a changeover of these functions or modes.

In the prior art lens barrel having a built-in surface wave motor, when Da and Dc in Equation (1) are about equal, the rotation ratio Rr can be set to an optional value by changing the ratio of Db and Db'. Moreover, when Da and Dc are not equal, the rotation ratio Rr can be set to an optional value in the same manner by adjusting all the parameters from Da through Dc. Accordingly, in the prior art lens barrel having a built-in surface wave motor, the angle through which the hand-operated ring 10 is required to rotate, from the ∞ position of the photographic range to the close position, can be set to a sufficient magnitude to perform a delicate manual adjustment, independently of the angle through which the cam ring 4 is rotatable.

However, even though all the parameters from Da through Dc can be adjusted, once the values are set in a manufactured product, it is then impossible to successfully change these values later. Accordingly, the rotation ratio cannot be altered during photography according to the photographic conditions, thus limiting the freedom of focus adjustment.

SUMMARY OF THE INVENTION

It is an object of the present invention to provide a lens barrel having a built-in surface wave motor which eliminates the problems of the prior art lens barrel described above.

It is another object of the present invention to provide a lens barrel having a built-in surface wave motor which can alter the rotation ratio according to the photographic conditions, and in which the operation of manual focus adjustment is easily performed.

Objects and advantages of the present invention are achieved with a lens barrel, comprising a photographic optical system; a fixed barrel; a surface wave motor having a fixed member to generate surface waves, the fixed member being freely rotatable centered on the optical axis of the fixed barrel; a moving member in frictional contact with the fixed member to generate drive force to drive the photographic optical system, and rotatably centered on the optical axis by the surface waves; an externally operated manual operation unit to drive the photographic optical system; a rotation angle conversion device to transmit the rotation angle of the manual operation unit to a rotation angle of the fixed member of the surface wave motor at a plurality of ratios; and, a rotation ratio changeover device to change the ratio of the rotation angle transmitted by the rotation angle conversion device to a specific ratio.

In accordance with embodiments of the present invention, the rotation angle conversion device is located in the fixed barrel, is freely rotatable and contacts the manual operation unit, and includes a rotary member having a plurality of different diameter portions with different external diameter, and the rotation ratio conversion device includes a plurality of changeover rings in the fixed barrel, to contact the different diameter portions of the rotation angle conversion device to change the ratio to a specific ratio.

In accordance with embodiments of the present invention, the lens barrel may further comprise a biasing unit to cause compressive contact of the manual operation unit and respective changeover rings via the rotary member.

In accordance with embodiments of the present invention, the rotary member may include at least a first roller and a second roller which change the external diameter in a direction at right angles to the optical axis, and the rotation ratio changeover device includes at least a first changeover ring contacting the first roller and a second changeover ring contacting the second roller, mutually moving forward and backward in the optical axis direction, and changing the ratio of the rotation angle transmitted by the rotation angle conversion device to a first ratio or a second ratio.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
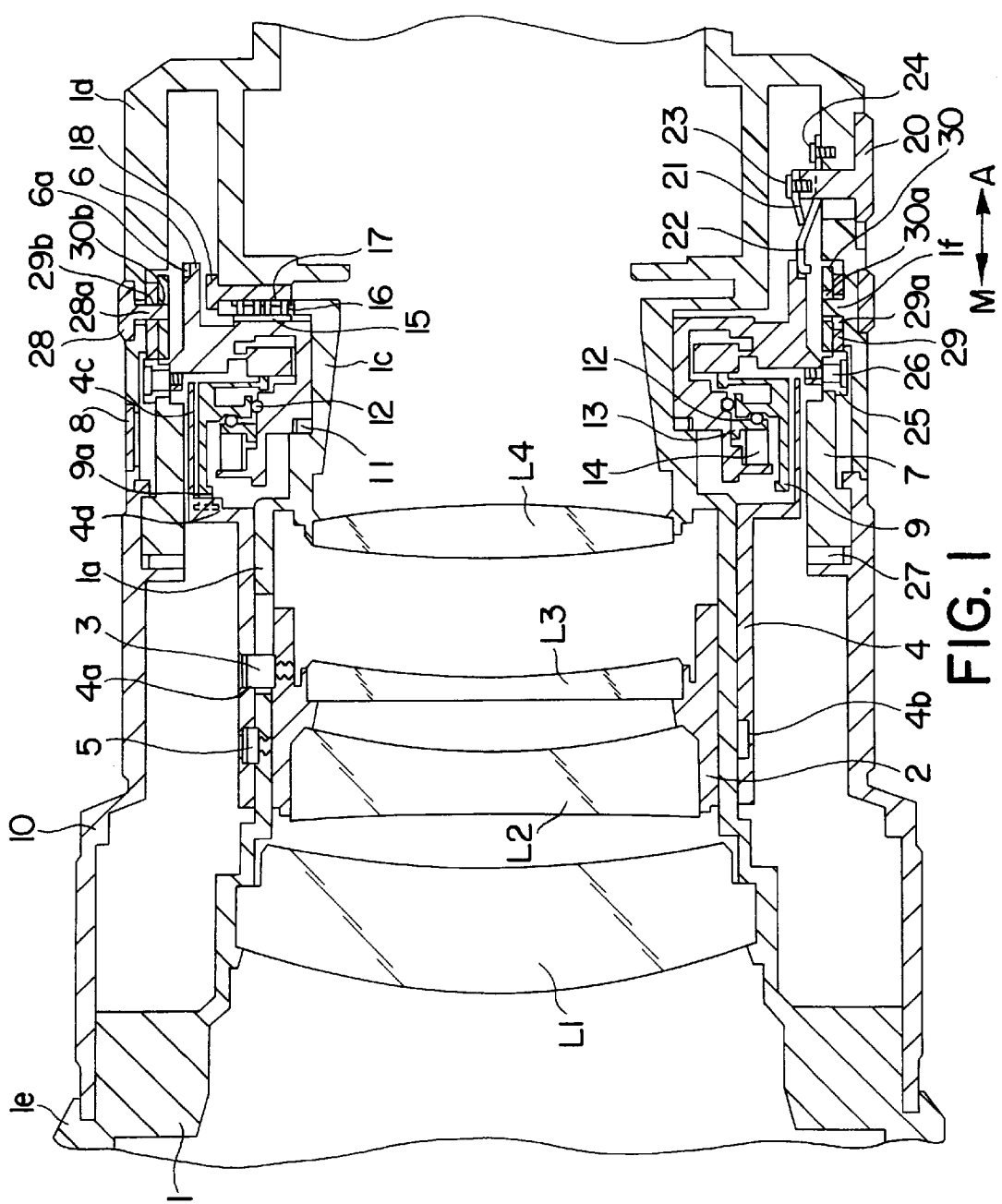
FIG. 1 is a cross-sectional diagram of a lens barrel having a built-in surface wave motor in accordance with embodiments of the present invention.

Reference will now be made in detail to the preferred embodiments of the present invention, examples of which are illustrated in the accompanying drawings, wherein like reference numerals refer to like elements throughout.

Figure 2A:
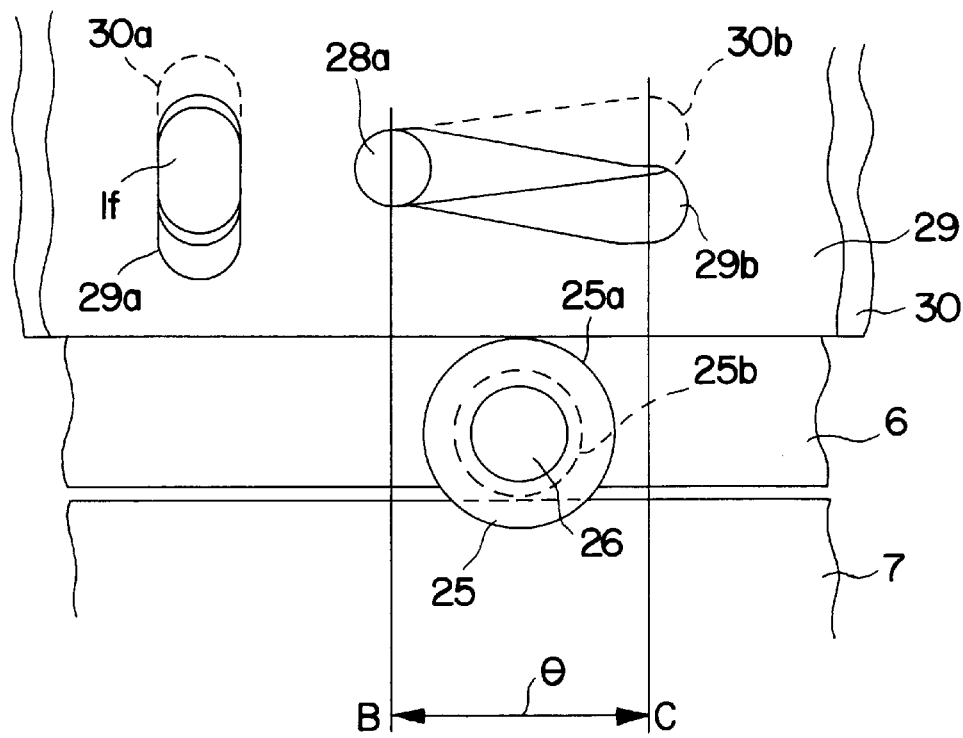
FIG. 2A is a partial side view diagram of the lens barrel having a built-in surface wave motor seen from the axial direction outer side and showing rollers and changeover rings in accordance with embodiments of the present invention.
Figure 2B:
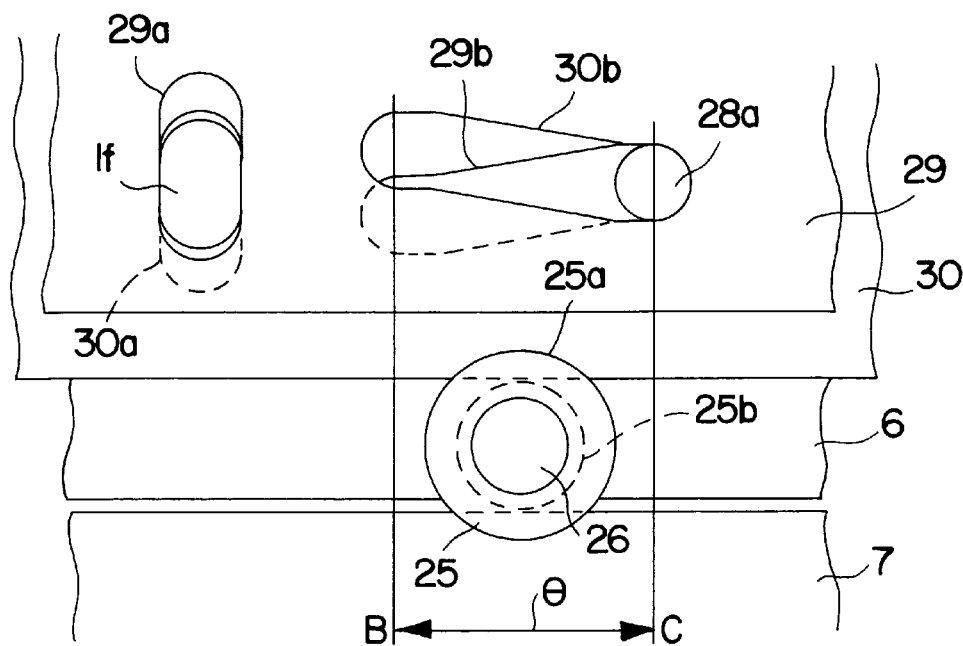
FIG. 2B is a partial side view diagram illustrating a drive pin of a rotation ratio setting ring in accordance with embodiments of the present invention.
Figure 3:
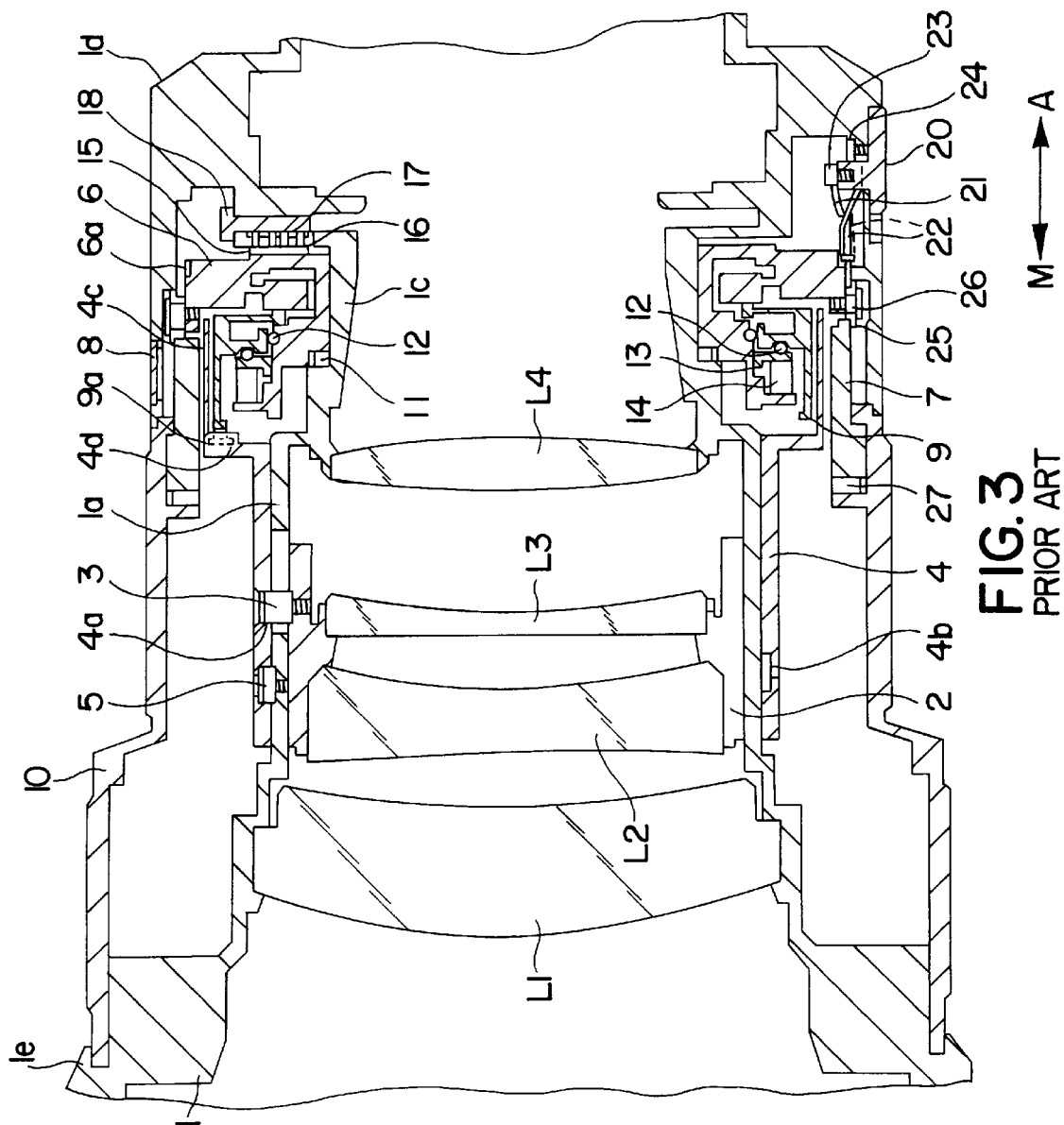
FIG. 3 is a cross-sectional diagram of a prior art lens barrel having a built-in surface wave motor.
Figure 4:
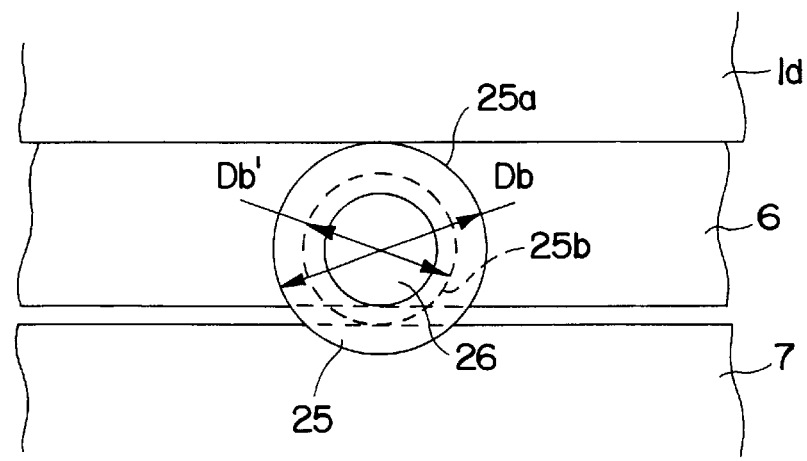
FIG. 4 is a partial side view diagram of the roller of a prior art lens barrel having a built-in surface wave motor seen from the axial direction outer side.
Figure 5:
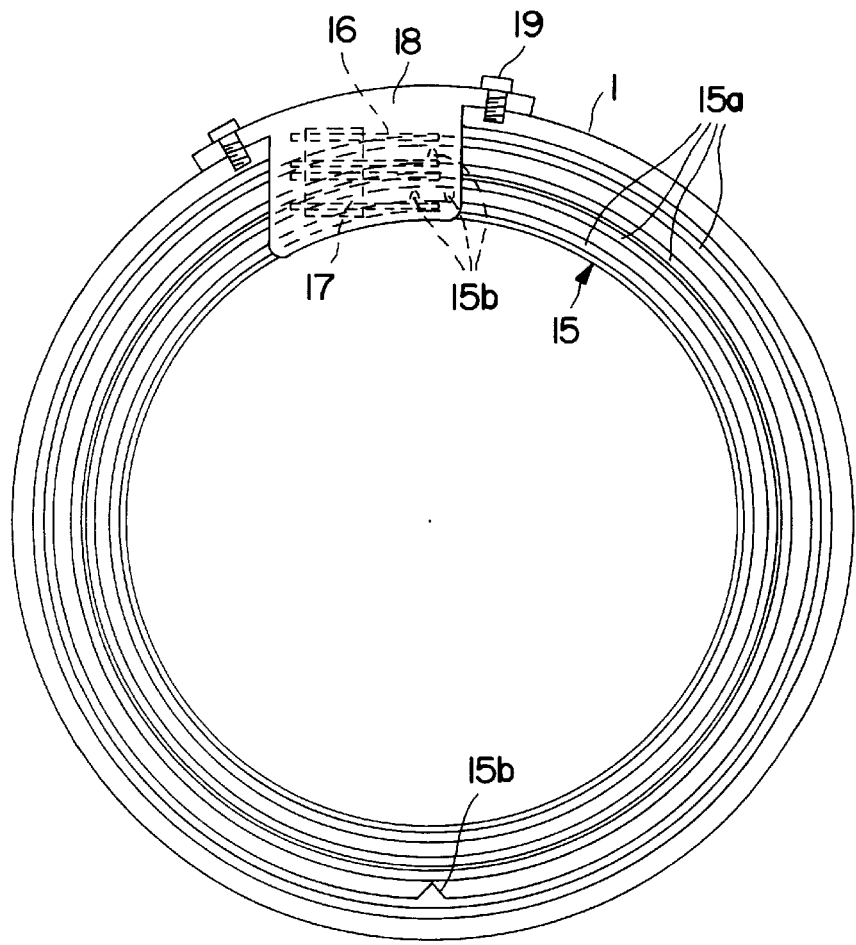
FIG. 5 is a cross-sectional diagram showing an electrical power supply unit of a prior art lens barrel having a built-in surface wave motor.
Figure 6:
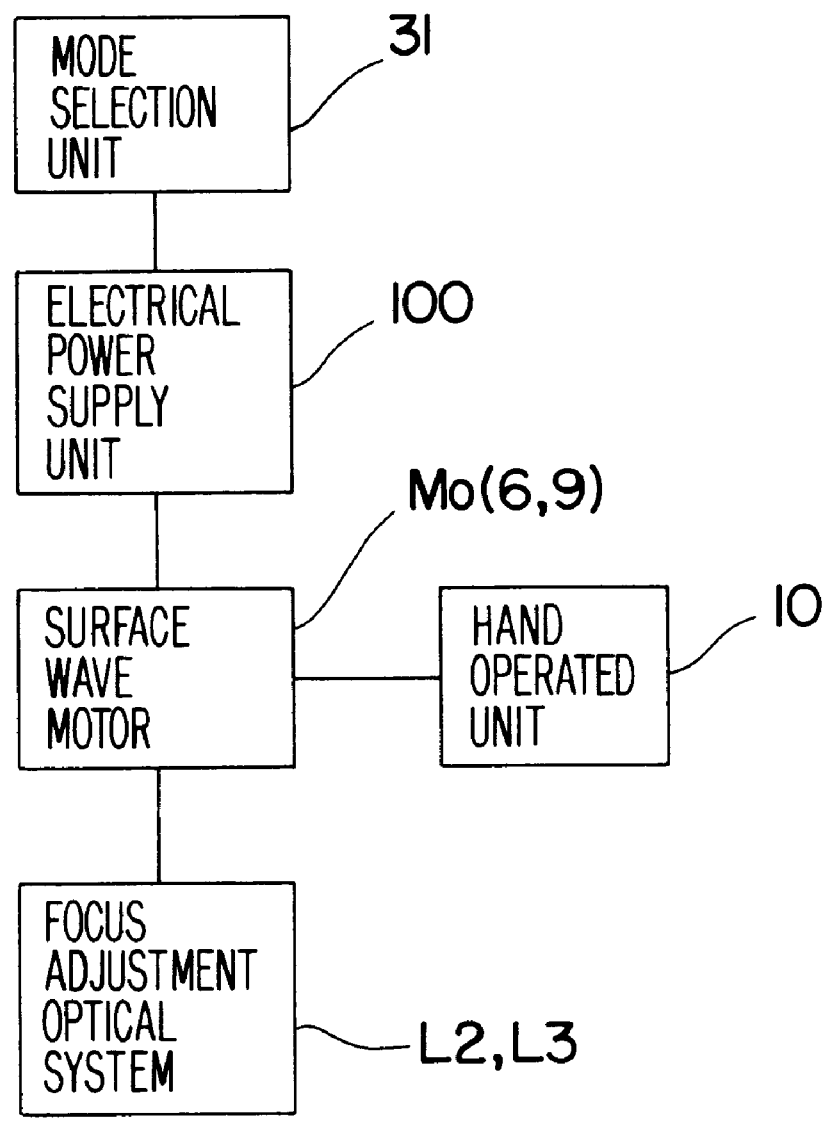
FIG. 6 is a schematic block diagram of a prior art lens barrel having a built-in surface wave motor.

Preferred embodiments of the present invention will now be described hereinbelow with reference to FIGS. 1 and 2. FIG. 1 is a cross-sectional diagram of a lens barrel having a built-in surface wave motor in accordance with preferred embodiments of the present invention. FIG. 2A is a partial side view diagram of the lens barrel having a built-in surface wave motor seen from the axial direction outer side and showing rollers and changeover rings in accordance with preferred embodiments of the present invention. FIG. 2B is a partial side view diagram illustrating a drive pin 28a of a rotation ratio setting ring 28 rotated through an angle θ from a position B to a position C in accordance with preferred embodiments of the present invention.

Furthermore, elements which are the same as those described with respect to the prior art lens barrel having a built-in surface wave motor shown in FIGS. 3–6 are referred to by the same reference numerals and symbols, and a detailed description of these like elements will not be repeated here.

Referring to FIG. 1, a rotation setting ring 28 is rotated by operation of the photographer to change the ratio of the rotation angle of the fixed element 6 of the surface wave motor Mo and the hand-operated ring 10 to a specific ratio. As shown in FIG. 1, the rotation ratio setting ring 28 is fitted into the outer circumferential portion of the large diameter portion 1d of the fixed barrel 1. As shown in FIG. 2, the rotation ratio setting ring 28 is rotatable between a position B and a position C. The rotation ratio setting ring 28 includes a drive pin 28a projecting from its inner circumferential surface, as shown in FIG. 2, which fits into cam grooves 29b, 30b of changeover rings 29, 30.

The changeover rings 29, 30 mutually move forward and backward in the optical axis direction, and contact the large diameter portion 25a and small diameter portion 25b, respectively, of the roller 25, to change the ratio of the rotation angle of the fixed element 6 and the rotation angle of the hand-operated ring 10 to a specific ratio. As shown in FIG. 1, the changeover ring 29 is fitted in the inner circumferential surface of the large diameter portion 1d of the fixed barrel 1, inside of the rotation ratio setting ring 28. Further, the changeover ring 30 is fitted in the inner circumferential surface of the changeover ring 29.

As shown in FIGS. 2A and 2B, a rectilinear guide 1f is formed in the inner circumferential portion of the large diameter portion 1d of the fixed barrel 1. The rectilinear guide 1f fits, in a freely movable state, into a rectilinear groove 29a and the cam groove 29b, formed in the changeover ring 29. Moreover, the rectilinear guide 1f fits, in a freely movable state, into a rectilinear groove 30a and the cam groove 30b formed in the changeover ring 30.

The operation of changing the ratio of the rotation angle of the fixed element 6 and the rotation angle of the hand-operated ring 10 to a specific ratio will now be described below.

In the state shown in FIG. 2A, when the rotation ratio setting ring 28 rotates, the drive pin 28a moves from the position B to the position C along the cam grooves 29b, 30b of the changeover rings 29, 30, respectively. The changeover rings 29, 30 are regulated by the rectilinear guide 1f which fits into the rectilinear grooves 29a, 30a such that only a predetermined amount of rectilinear motion is possible in the optical axis direction. As shown in FIG. 2A, in order for the cam groove 29b to receive the drive force of the drive of the drive pin 28a, the changeover ring 29 commences motion in the optical axis direction from a state in contact with the large diameter portion 25a of the roller 25, and separates from the large diameter portion 25a. On the other hand, as shown in FIG. 2A, the changeover ring 30 moves in the optical axis direction from a state separated from the small diameter portion 25b of the roller 25, and contacts the small diameter portion 25b, as shown in FIG. 2B.

When the hand-operated ring 10 is operated to rotate, the roller 25 rotates between the intermediate ring 7 and the changeover ring 29 or the changeover ring 30, and the fixed element 6 rotates centered on the optical axis on the circumference of the central small diameter portion 1c of the fixed barrel 1.

In the state shown in FIG. 2A, the ratio Rr of the rotation angles of the cam ring 4 relative to the rotation angle of the hand-operated ring 10 is represented by Equation (1), described hereinabove.

$$Rr = (Db \cdot Dc)/(Da \cdot Db' + Db \cdot Dc) \qquad \text{Eq. (1)}$$

Next, when the rotation setting ring 28 is rotated through an angle θ, the state becomes that shown in FIG. 2B, and because the intermediate ring 7 and the changeover ring 30 come into contact with the small diameter portion 25b of the roller 25, Db=Db'.

As a result, the ratio Rr' of the rotation angle of the cam ring 4 relative to the rotation angle of the hand-operated ring 10 is represented by the following Equation (2).

$$Rr' = (Db' \cdot Dc)/(Da \cdot Db' + Db' \cdot Dc) = Dc/(Da + Dc) \qquad \text{Eq. (2)}$$

In accordance with preferred embodiments of the present invention, by rotating the rotation ratio setting ring 28, the changeover ring 30 is caused to contact the small diameter portion 25b, while causing the changeover ring 29 to contact the large diameter portion 25a. Because of this, the ratio of the rotation angle of the cam ring 4 (fixed element 6) relative to the rotation angle of the hand-operated ring 10 can be changed in two steps. As a result, by rotating the hand-operated ring 10 when photographing, when the focus adjustment optical system L1, L2 is driven in the optical axis direction, the rotation angle of the cam ring 4 is changeable in two steps, and the focus adjustment optical system L1, L2 can be driven quickly or slowly.

For example, in the state shown in FIG. 2A, when the diameter Db of the large diameter portion 25a is twice the diameter Db' of the small diameter portion 25b, and when the diameter Db and the diameter Dc are about equal, the ratio of the rotation angle of the cam ring 4 (fixed element 6) relative to the hand-operated ring 10 is about ⅔. Accordingly, as shown in FIG. 2A, when the hand-operated ring 10 is rotated with the changeover ring 29 contacting the large diameter portion 25a, generally this focus adjustment is possible, greatly driving the focus adjustment optical system L1, L2, even from the state shown in FIG. 2B. On the other hand, as shown in FIG. 2B, when the hand-operated ring 10 rotates with the changeover ring 30 contacting the small diameter portion 25b, the focus adjustment optical system L1, L2 is driven by a small step, making fine focus adjustments possible.

Moreover, in accordance with preferred embodiments of the present invention, after the cam ring 4 is rotated to a predetermined angle, and has stopped on reaching the rotation limit, when the hand-operated ring 10 rotates further, the hand-operated ring 10 and the intermediate ring 7 slide at an abutment surface with the biasing member 27. Because of the sliding between the hand-operated ring and the intermediate ring 7, there is no excessive torque previously from the intermediate ring 7, and there is no inadvertent damage to the constituent elements of the lens barrel.

The present invention is not limited to the embodiments described hereinabove, and various modifications and changes are possible within the scope of the invention.

For example, in accordance with the embodiments of the lens barrel having a built-in surface wave motor described hereinabove, the changeover rings 29, 30 contact the large diameter portion 25a and the small diameter portion 25b, respectively, and the ratio of the rotation angles of the hand-operated ring 10 and the cam ring 4 change in two steps. However, the present invention is not limited to a roller 25 having two different diameter portions. For example, the roller 25 may be formed with three or more steps (different diameter portions), and three or more changeover rings may contact the respective steps, such that the ratio of the rotation angles of the hand-operated ring 10 and cam ring 4 can be changed in three or more steps.

Moreover, in accordance with preferred embodiments of the present invention, the roller 25 includes an inner ring made of metal with its outer circumference covered with rubber. However, the roller 25 can be formed wholly of metal, synthetic resin, rubber or the like. Alternatively, the roller 25 may also be a composite of two materials.

Furthermore, in accordance with preferred embodiments of the present invention described hereinabove, the roller 25 has been described as an example of a rotation angle conversion device; however, a small step gear wheel may be substituted for the roller. In the case that a gear wheel is used instead of the roller 25, an annular gear wheel is formed at the right-hand end of the intermediate ring 7 and the large diameter of the fixed barrel 1 which engages with the small gear wheel. As a result, backlash can be eliminated because the gear wheels are biased by the biasing member 27.

In the lens barrel having a built-in surface wave motor in accordance with preferred embodiments of the present invention described hereinabove, after the cam ring 4 has stopped after reaching its predetermined rotation angle limit, when the hand-operated ring 10 rotates further, the hand-operated ring 10 and the intermediate ring 7 slip on the abutment surface of the biasing member 27 such that no excessive torque arises. However, the present invention is not limited to this arrangement. For example, the hand-operated ring 10 and the intermediate ring 7 can be made integral and, the biasing member 27 may be made to slip on the abutment surface with the roller 25 as it presses thereon.

In accordance with preferred embodiments of the present invention described hereinabove, the fixed element 6 is not easily rotatable when in the automatic focus adjustment mode, and the fixed element 6 is pressed to the inner circumferential surface of the large diameter portion 1d of the fixed barrel 1 by the biasing member 11 to confer a predetermined frictional torque. Moreover, the fixed element 6 is pressed to the inner circumferential surface of the large diameter portion 1d via the intermediate ring 7 and roller 25 by the biasing member 27. Because of this, by taking into account the balance of the frictional torque of the constituent members, the biasing member 11 can be omitted.

In accordance with embodiments of the present invention described in detail hereinabove, a rotation angle conversion device transmits the rotation angle of a hand-operated unit to the rotation angle of a fixed member of a surface wave motor at a plurality of ratios. Further, because the rotation ratio changeover device changes plural ratios to specific ratios and changes the rotation ratio according to photographic conditions, the rotation ratio can be easily altered. Furthermore, operability in the manual focus adjustment mode is excellent.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A lens barrel, comprising:

a photographic optical system having an optical axis;

a fixed barrel;

a surface wave motor having a fixed member to generate surface waves, the fixed member being freely rotatable centered on the optical axis;

a moving member rotatably centered on the optical axis and in frictional contact with the fixed member to generate drive force to drive the photographic optical system by the surface waves;

an externally operated manual operation unit to drive the photographic optical system;

a rotation angle conversion device to transmit the rotation angle of the manual operation unit to a rotation angle of the fixed member of the surface wave motor at a plurality of ratios; and a rotation ratio changeover device to change the ratio of the rotation angle transmitted by the rotation angle conversion device to a specific ratio.

2. A lens barrel as recited in claim 1, wherein the rotation angle conversion device is located in the fixed barrel, is freely rotatable and contacts the manual operation unit, and includes a rotary member having a plurality of portions with different external diameters, and the rotation ratio changeover device includes a plurality of changeover rings in the fixed barrel, to contact the different diameter portions of the rotation angle conversion device to change the ratio of the rotation angle to a specific ratio.

3. A lens barrel as recited in claim 2, further comprising:

a biasing unit to cause compressive contact of the manual operation unit and respective changeover rings via the rotary member.

4. A lens barrel as recited in claim 2, wherein the rotary member includes at least a first roller and a second roller having respective external diameters which change external diameter in a direction at right angles to the optical axis, and the rotation ratio changeover device includes at least a first changeover ring contacting the first roller and a second changeover ring contacting the second roller, mutually moving forward and backward in the optical axis direction, and changing the ratio of the rotation angle transmitted by the rotation angle conversion device to a first ratio or a second ratio.

5. A lens barrel having a photographic lens, comprising:

a surface wave motor having a fixed member in which surface waves are generated;

a manual operation member to drive the photographic lens by manual operation; and a rotation ratio setting device to change a ratio of a rotation angle between the fixed member and the manual operation member.

6. A lens barrel as recited in claim 5, wherein the rotation ratio setting device comprises a rotation ratio setting ring rotatable between a plurality of positions to change the ratio of the rotation angle.

7. A lens barrel as recited in claim 5, wherein the rotation ratio setting device comprises a roller having a plurality of portions with different external diameters and a plurality of rings in contact with the respective different diameter portions of the roller to change the ratio of the rotation angle.

8. A lens barrel as recited in claim 6, wherein the rotation ratio setting device further comprises:

a roller having a plurality of portions with different external diameters, and wherein the rotation ratio setting ring is rotated to the plurality of positions to cause the respective different diameter portions of the roller to transmit the rotation angle of the manual operation member to the fixed member at a plurality of ratios.

9. A lens barrel as recited in claim 7, wherein the roller includes a first roller and a second roller having different external diameters, and the plurality of rings include a first changeover ring contacting the first roller and a second changeover ring contacting the second roller, the first changeover ring and the second changeover ring mutually moving forward and backward in the optical axis direction and changing the rotation angle set by the rotation ratio setting device to a first ratio or a second ratio.

10. A camera including a lens barrel housing a photographic optical system, comprising:

a fixed barrel;

a surface wave motor having a fixed member in which surface waves are generated, the fixed member being rotatable centered on an optical axis of the photographic optical system;

a moving member rotatable centered on the optical axis and in frictional contact with the fixed member to receive drive force from the surface waves to drive the photographic optical system;

a roller mounted on the fixed member;

a manual operation unit, in compressive contact with the roller, to drive the photographic optical system;

a mode selection switch to set a manual focus adjustment mode of operation to cause the fixed member to come into compressive contact with the roller;

a changeover ring; and a rotation ratio setting ring which is rotatable to cause the roller to contact the changeover ring to change a ratio of a rotation angle between the fixed member and the manual operation member.

11. A camera having a lens barrel housing a photographic optical system, comprising:

surface wave motor means, including a rotatable fixed means for generating a surface wave to drive the photographic optical system;

manual driving means rotatable for driving the photographic optical system by a manual rotation operation; and means for setting a ratio of rotation of a rotation angle of the manual driving means with respect to the fixed means.

* * * * *